United States Patent [19]

Senyard, Sr. et al.

[11] Patent Number: 5,032,273
[45] Date of Patent: Jul. 16, 1991

[54] APPARATUS FOR SEPARATING SAND AND OIL FROM A WASTE WATER STREAM

[76] Inventors: Corley P. Senyard, Sr., 5319 Didesse, Suite B, Baton Rouge, La. 70809; Corley P. Senyard, Jr., 624 Main St., League City, Tex. 77573; Thomas J. Senyard, 5319 Didesse, Suite B, Baton Rouge, La. 70809

[21] Appl. No.: 391,472

[22] Filed: Aug. 8, 1989

Related U.S. Application Data

[63] Continuation of Ser. No. 160,705, Feb. 26, 1988, Pat. No. 4,855,050, which is a continuation-in-part of Ser. No. 902,592, Sep. 2, 1986, Pat. No. 4,737,282, which is a continuation-in-part of Ser. No. 648,497, Sep. 10, 1984, Pat. No. 4,626,360.

[51] Int. Cl.$^5$ .......................................... B01D 17/028
[52] U.S. Cl. ............................. 210/494.2; 210/497.1; 210/512.1; 210/513; 210/521
[58] Field of Search .............. 210/167, 168, 258, 260, 210/512.1, 304, 494.2, 497.1, 513, 521

[56] References Cited

U.S. PATENT DOCUMENTS

| | | | |
|---|---|---|---|
| 2,806,599 | 9/1957 | Patrick | 210/512.1 |
| 3,520,415 | 7/1970 | Munson | 210/177 |
| 3,529,719 | 9/1970 | Graybill | 210/304 |
| 3,888,768 | 6/1975 | Graybill | 210/304 |
| 3,893,918 | 7/1975 | Fauret, Jr. | 210/104 |
| 4,066,540 | 1/1978 | Wada et al. | 210/221.2 |
| 4,186,087 | 1/1980 | Kato | 210/221.2 |
| 4,198,300 | 4/1980 | Williams | 210/170 |
| 4,217,211 | 8/1980 | Mill | 210/522 |
| 4,221,671 | 9/1980 | Meurer | 210/522 |

Primary Examiner—Richard V. Fisher
Assistant Examiner—Wanda L. Millard
Attorney, Agent, or Firm—Pravel, Gambrell, Hewitt, Kimball & Krieger

[57] ABSTRACT

An oil separator for removing oil from a flowing waste stream of waste fluid comprising a cylindrical separator body having a bore with a center, and a plurality of vanes comprising a surface capable of coalescing oil particles traversing the bore in a spiral path. The center of the bore is occupied by a central portion defined by a cylinders progressively smaller than the body with a first and second set of vanes extending therefrom.

6 Claims, 9 Drawing Sheets

APPARATUS FOR SEPARATING SAND AND OIL FROM A WASTE WATER STREAM

CROSS-REFERENCE TO RELATED APPLICATION

This is a continuation of copending application Ser. No. 07/160,705, filed 02/26/88, which is now U.S. Pat. No. 4,855,050, which is a continuation-in-part of pending U.S. patent application No. 06/902,592, filed Sept. 2, 1986, which is now U.S. Pat. No. 4,737,282, which is a continuation-in-part of U.S. patent application No. 06/648,497, filed Sept. 10, 1984, now U.S. Pat. No. 4,626,360.

BACKGROUND OF THE INVENTION

1. Field of the Invention

The present invention relates to the treatment of a waste water stream containing water, oil, sand, oily sand and gas to separate the oil, sand, gas and water out of the waste water stream. In particular, the present invention is related to a method and apparatus for use on offshore and onshore oil and gas well drilling operations whereby the water and sand can be purified to a point at which it can be released into the environment without damaging the environment.

2. Description of the Prior Art

Most oil and gas wells both onshore and offshore produce a large amount of waste water which commonly contains oil, gas and sand. The sand contained in the waste water stream frequently is contaminated or soaked with oil to the extent that the sand cannot be discharged into the environment because of the environmentally dangerous levels of oil contained in the sand. Most state and federal regulations now require that waste water and sand discharge into the environment meet certain maximum limitations on the amount of oil contained therein.

U.S. Pat. No. 4,198,300 discloses an apparatus for removing suspended oil droplets from water, including a vertical pipe suspended from an offshore oil platform partially submerged in the sea surrounding the platform, a means for injecting a waste water stream into the middle portion of the pipe and a means for injecting gas into the lower portion of the pipe and for diffusing the gas to disperse the gas into gas bubbles, so that the gas bubbles counter currently contact the waste water stream as the gas bubbles rise to the upper portion of the pipe, thereby attaching the oil droplets and reducing the overall density of the oil droplets efficiently so that the upper velocity of the oil droplets is greater of the downward velocity of the waste water stream and promoting the separation of oil droplets from the waste water stream, and means for withdrawing the oil droplets from the upper portion of the pipe. The apparatus uses natural gas air or inner gas as the gas medium for forming the gas bubbles.

U.S. Pat. No. 4,221,671 discloses an upright circular tube settler with stacked tube modules for removal of solids from fluids and for removal of one fluid from another. The tube modules are for use in a tube settler of the type having vertically disposed concentric tubular walls. The modules contained concentric rows of essentially straight fluid flow passages open at both ends, the passages in each row of a particular model being tilted relative to the vertical in the same direction and to substantially the same degree, the passages in each row being skewed in relation to other passages in the same row of the same tier. The passages cooperate to provide means for directing fluid in a substantially spiral path around a tank.

U.S. Pat. No. 4,217,211 discloses a sewage treatment process wherein sewage is passed into deep underground shaft and is improved by passing a liquor of the sewage in the underground shaft through an inner shaft which extends only part way down into the underground shaft. A mixing shaft and liquor nozzles are provided for receipt of the sewage liquor passing downwardly. The action of the descending liquor through the nozzles entrains ascending liquor from the shaft into the descending liquor resulting in recirculation which allows extended contact time or the liquor with a microorganisms used to digest the sewage.

U.S. Pat. No. 4,186,087 discloses a method and apparatus for separating substances from liquids by flotation using bubbles comprising absorbing a substance present in a liquid on bubbles, floating the bubbles absorbing the substances and separating the substance from the bubbles, characterized by allowing the bubbles absorbing the substance to ascend through a fluid route in a tube independent of the ambient turbulently flowing liquid and then collecting and separating the substance from the liquid at the upper end of the tube. The apparatus includes a vertical column provided at the bottom with a gas-diffusing means and a tube placed inside the vertical column, the tube being provided with a means for collecting bubbles at the lower end and concentrating in the collected bubbles at the upper end.

U.S. Pat. No. 4,066,540 comprises a vertical column for continuous froth flotation having therein a froth separator, a raw water inlet pipe, a treated water discharge pipe and gas dispersing unit, and stepped shelves disposed inside the column and adapted to provide thorough contact between the bubbles and water subjected to treatment.

U.S Pat. No. Re. 28,378 discloses an apparatus for effecting purification of liquids by flotation wherein a mixture of gas in liquid is subjected to sufficient pressure for the gas to dissolve in the liquid and to form a solution of the gas in the liquid. The solution is introduced into a flotation tank and pressure is lowered to form gas bubbles in the tank at a slow rate, thereby forming very small bubbles. The slow rate at which the very small gas bubbles are formed provides purification of polluted liquids by flotation.

U.S. Pat. No. 3,893,918 discloses a method for separating materials leaving a well including utilizing an elongated separator conduit partially above and below the surface of a body of water to establish a fluid column in the water, supplying an oil containing fluid mixture in the fluid column and causing the fluid to float downwardly through a flowing zone over a plurality of baffle means to induce coalescent separation of oil from fluid, intermittently interrupting the supply of fluid to impede the downward velocity of fluid for a time sufficient for oil to rise from the flowing zones into the quiescent zones defined by the baffles, flowing oil accumulated in the quiescent zones upwardly to establish an upper layer of oil in the fluid column, flowing oil accumulated in the lower quiescent zones through the upper quiescent zones, withdrawing oil from the upper oil layer, and flowing the oil free liquid from the exit zone of the separator from the body of water beneath the surface thereof.

U.S. Pat. No. 3,520,415 discloses a separation vessel disposed in a vertical column for separating a hydrocarbon material from a slurry of water, bitumen, and sand. The vessel includes a impeller mechanism, a sand settling zone, and a froth disengaging zone. A set of turbulence reducing baffles is mounted between the underwash sparger and the froth withdrawal conduit.

U.S. Pat. No. 2,806,599 discloses a vacuum control for gravity separators utilized for effectively recovering extremely fine fractions of sand suspended in water utilizing a low pressure cyclone gravity separator whereby fluids are spiraled about in a cyclone in a circular manner to separate solids such as sand from the fluids.

U.S. Pat. No. 2,754,980 discloses a fluid separator for separating solids or liquid particles from fluids. The separator is disposed in a vertical manner and contains no moving parts. The fluid is helically whirled in a stream so that the particles become centrifugally concentrated in the outer peripheral regions of the stream, the fluid stream opening tangentially into the upper end of a vertical casing, a well inside with the lower end open to the interior of the casing and upper open exterior of the casing, means in the well for impressing a helical path upon the fluids stream passing from the bottom to the top of the well, and an ejecter zone intermediately at the end of the well.

U.S. Pat. No. 1,869,241 discloses a vertical apparatus for the separation of the solid substances, such as for separating the graphite from its ore by the emulsion process. The fluids flows through a central pipe and into a series of baffles to effect separation of solids from the fluid.

U.S. Pat. No. 1,458,805 discloses an apparatus for the settlement of solid particles in suspension in liquids and discloses a vertical column having a series of baffles therein, and a number of parallel sloping settling surfaces separated by similar settling spaces to separate particles from a liquid stream flowing therethrough.

U.S. Pat. No. 3,359,357 discloses a process and apparatus for refining hydrocarbons which includes a vertical column having an inclined spiral plate over which the fluids are flowed.

The above patents disclosed various separation and flow treatment devices but none show the novel combination of elements provided for separating oil, gas, sand and water in a waste water stream disclosed in the present invention.

SUMMARY OF THE INVENTION

In accordance with the present invention there is provided an apparatus for separating oil, gas and sand from a waste water stream and for separating oil from oily sand and the waste water stream including an upper oil manager assembly for collecting and conveying oil separated from a waste water stream, a sand helix assembly connectable to the upper oil manager assembly for separating sand particles and oil particles from a waste water stream, a sand manager assembly connectable to the sand helix assembly for collecting sand separated from the stream of waste water and removing oil from the sand, a flow control assembly connectable to the sand manager assembly for controlling the flow of oil, water and sand through the apparatus, a lower oil manager assembly connectable to the flow control assembly for receiving oil and transferring oil to a storage facility outside of the apparatus, and an oil helix assembly connectable to the lower oil manager assembly for separating oil from the waste water stream.

The present invention has the advantage over the prior art of much more thoroughly cleaning a waste water stream. Furthermore, the invention can be made in module form so that the degree of cleanliness of the effluent can be varied depending upon the number of sand helix and oil helix modules added to apparatus.

In addition, the present invention can remove oil from sand to a higher degree of purity, thereby enabling sand previously contaminated with oil to be discharged into the environment without damaging the environment.

DESCRIPTION OF THE PREFERRED EMBODIMENTS

Figure 1:
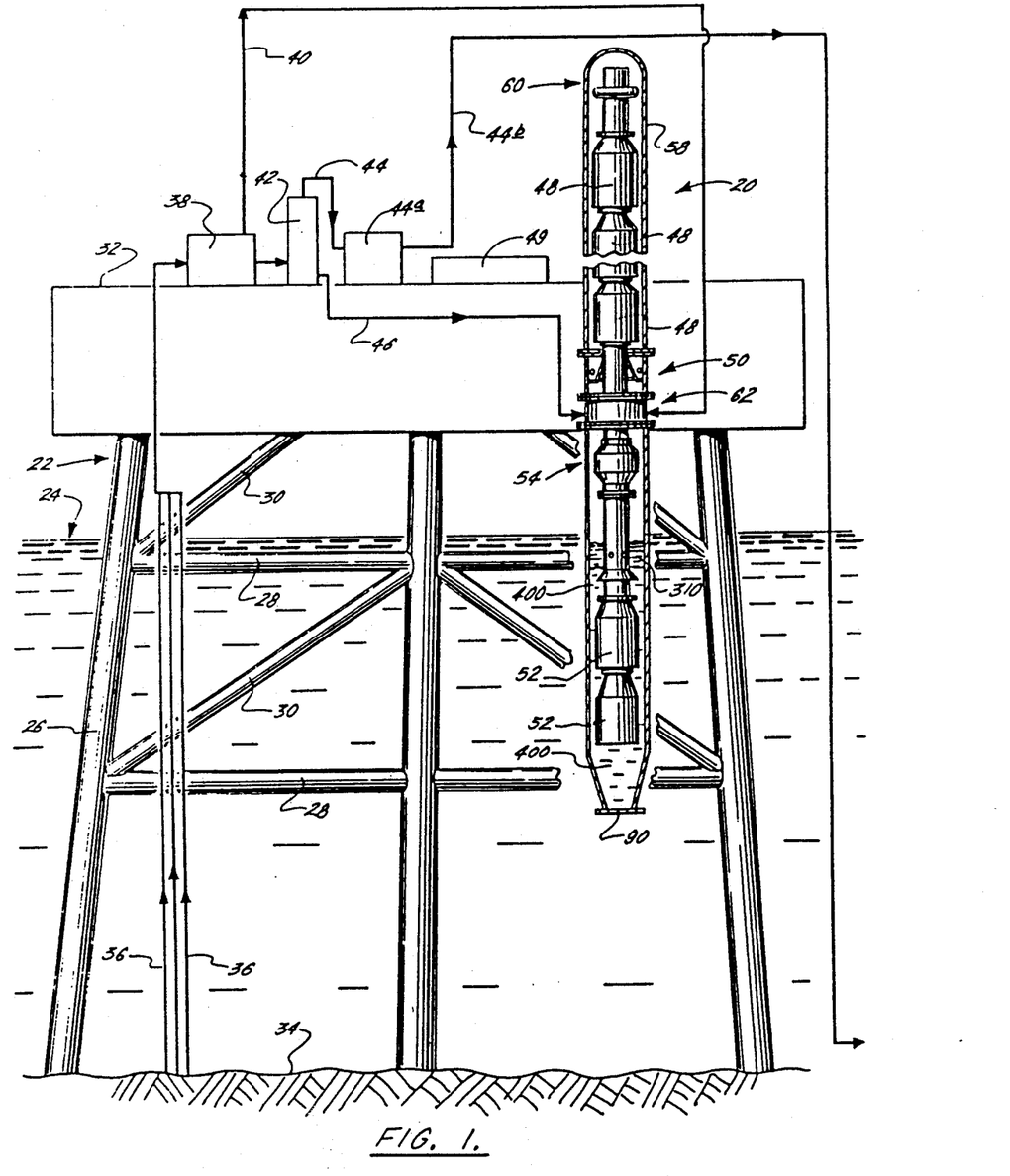
FIG. 1 is a schematic elevational view, partially in section, showing an offshore production platform including the separation apparatus of the present invention.

Referring now to the drawings, in FIG. 1 is shown the separator of the present invention generally indicated by the numeral 20 connected to offshore platform 22 located in a body of water 24 in a manner similar to that described in U.S. Pat. No. 4,198,300. Platform 22 is a fixed, bottom supported structure typical of those used for offshore drilling and production and is fabricated from a plurality of welded members including legs 26, cross braces 28 and diagonal braces 30. The structural members provide the platform with the strength necessary to support platform deck 32 and withstand the wind, waves and sea current encountered in an offshore environment.

As shown in the drawing, platform 22 is a production platform capable of treating and storing the fluids such as oil and gas produced from a nearby offshore field. Rising from the sea floor 34 are a series of well pipes or conductors 36 which transport oil and gas produced from several well sites located within the offshore field. Platform 22 serves as a centralized collection and processing facility for the field.

Since fluids produced from oil fields frequently contain significant quantities of water in addition to oil and gas, the production facility must be equipped to segregate the oil, gas and water mixtures into their constituents. Platform deck 32 is shown in the drawings equipped with the components and apparatus necessary to substantially separate the produced fluids. Fluids from the well pipes 36 flow into gas separator 38 which separates the fluids into their liquid and gaseous components. Separator 38 is essentially a high pressure settling tank which permits the lighter hydrocarbon components, primarily methane, to flash off and separate from the heavier liquid components and to be withdrawn through gas line 40.

Liquid components from separator 38 then enter treater which separates the liquids into an oil stream 44 and a waste water stream 46. Pump 44a pumps the oil stream 44 to land or a reservoir through pipeline 44b. Treater 42 is typically a heater-treater which simultaneously heats and separates the oil and waste water mixture. The application of heat to the liquid stream assists in destabilizing the oil-water mixture. Demulsifying agents can also be added at this point to help break any oil-water emulsion which may have formed as a result of excessive mixing of the oil and water components. The separation unit of the treater may consist of a combination of weirs, coalesces, baffles and skimmers which serve to gravitationally separate the oil-water mixture.

Normally, treater 42 can substantially separate the oil-water mixture. However, such separation equipment at best will typically discharge a waste water stream which contains anywhere from 200 to 1000 parts per million of oil. Since the waste water effluent from an offshore rig must ultimately be discharged into the sea and the waste water from an inland rig must be discharged onto land, the oil content of the effluent has to be reduced even further to satisfy environmental regulations.

The apparatus and method of the present invention are employed to provide the necessary secondary treatment to waste water stream 46 to reduce its oil content and the amount of oil on sand to an environmentally acceptable level and to maximize recovery of oil from the offshore field. The separator apparatus of the invention is generally indicated by the numeral 20 and is vertically positioned in platform 22. As can be seen in FIG. 1, separator 20 extends from the position above the surface of the sea to a position substantially below the surface. Separator 20 should be securely attached to or supported by platform 22 so that it remains in a stable position eve when under the influence of strong wind, wave or current action. For example, separator 20 can be bolted o welded to the legs and braces 28 and 30 to provide the necessary structural support.

It should be noted that for purposes of the present invention, platform 22 to which separator 20 is secured need not be a fixed, bottom supported platform of the type shown in the drawings. Separator 20 can be supported by any type of offshore rig or structure which can be used for oil and gas production purposes. Such offshore rigs include conventional offshore production structure such as jackup rigs, concrete platforms, monopods and guyed towers. Moored production vessels adjacent buoyed production risers can serve to support the apparatus of the present invention. Furthermore, the separator of the invention could be utilized above sea level or onshore just as effectively.

The lower end of separator 20 is typically open to the sea at the bottom end 90 to permit the discharge of clarified waste water. If the separator were being used on land, a pipe or hose could be connected to lower end 90 to convey clarified waste water to any desired location. Gas is supplied to separator 20 from gas line 4 and waste water is supplied to separator 20 by line 46.

Separator 20 is composed of several separate components. These components include, beginning at the top of the embodiment of the separator shown in FIG. 1, an upper oil manager generally indicated by the numeral 60 in FIGS. 1 and 9 which collects oil from the sand helix 48 and conveys it to the lower oil manager 54; a sand helix generally indicated in FIGS. 1, 7 and 8 by the numeral 48 which processes the total water stream, separating solid (sand) particles from the oil-water stream in a counter current fashion, and separating some oil from the stream; a sand manager generally indicated in FIGS. 1, 5 and 6 by the numeral 50 which collects sand particles separated from the stream of water by the sand helix in a reservoir contained therein for further treatment; a water works executive generally indicated in FIGS. 1 and 4 by the numeral 62 which includes the controls, valves, meters and the like to control the oil, water, gas and sand flow between the various components; a lower oil manager generally indicated by the numeral 54 in FIGS. 1 and 10 for transferring oil upward to a reservoir; and an oil helix generally indicated by the numeral 52 in FIGS. 1, 2, and 3 which processes the total water stream and separates oil from the stream in a counter current fashion.

In the embodiment shown in FIG. 1, all of the components are utilized in combination. However, various subcombinations of the various components could be utilized under certain conditions. When it is desired to treat water containing oily sand, gas, and free oil to a point such that all particles greater than 50 microns in size have been removed, one should utilize the sand helix, sand manager, water works executive, oil helix, and oil managers If it is desired to treat water containing free oil but a negligible amount of sand to a point where the particle size of any particle in the stream is less than 50 microns, one could utilize only the oil helix, the water works executive, and the oil managers.

It can thus be seen that the separator referred to generally by the numeral 20 may contain a combination of the above components necessary to treat the contaminated water in single, vertical, cylindrical enclosure or casing indicated by the numeral 58. The following is a description of the complete system containing all the components for treating water containing oily sand, gas, and free oil.

Figure 9:
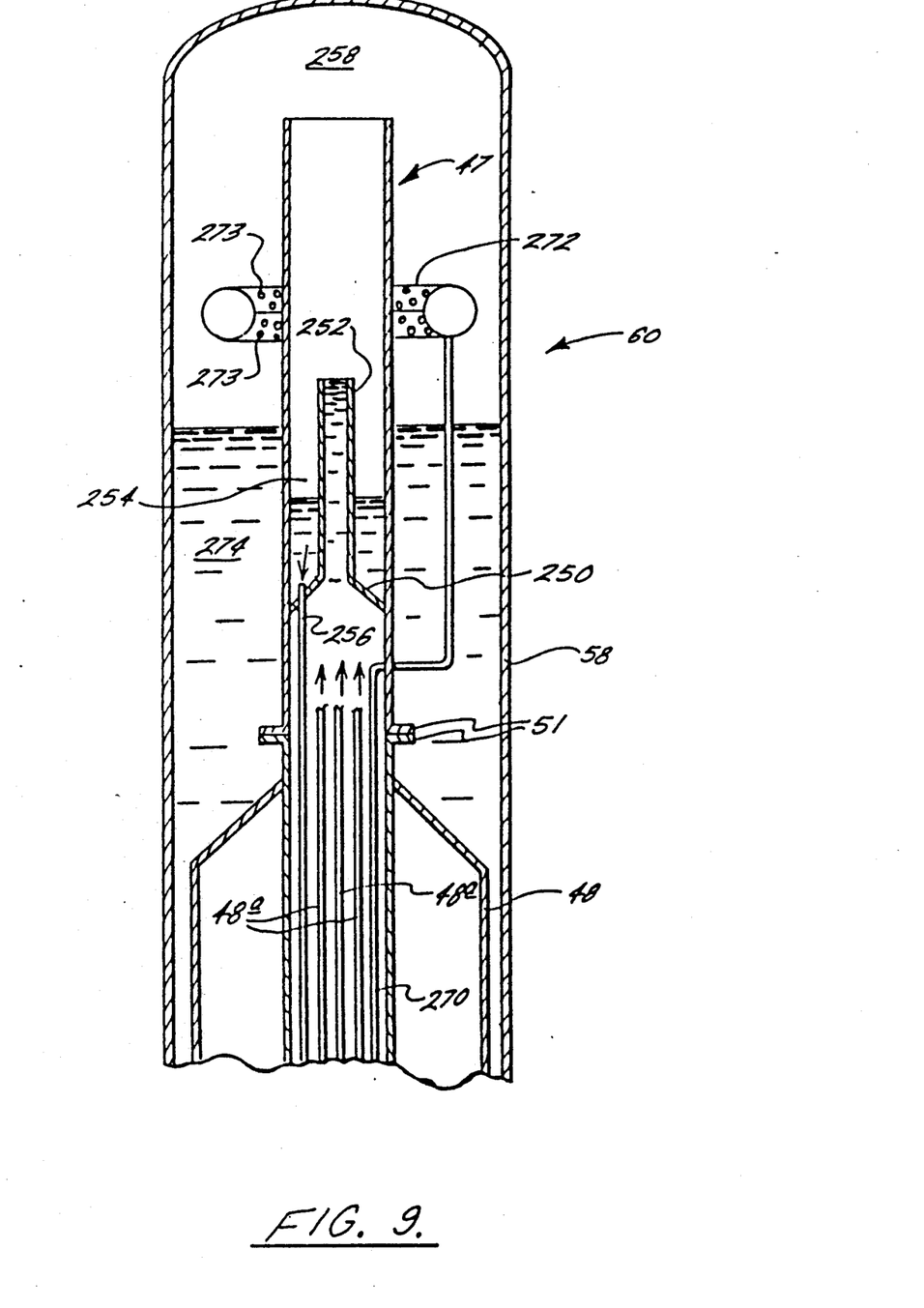
FIG. 9 is a schematic elevational view, partially in section, showing the upper oil manager of the present invention.

The separator containing the complete system is shown in FIG. 1 and is generally indicated by the numeral 20. At the top end of the vertical enclosure 58 containing the complete separator system 20 is the upper oil manager generally indicated by the numeral 60. The upper oil manager 60 receives oil from the sand helix modules 48 below and contains a weir mechanism for controlling the level of the oil therein. As can be seen in FIG. 9, the weir mechanism includes an inverted cone 250 having a vertical pipe 252 extending upward therefrom. Cone 250 and pipe are connected to the central conduit generally indicated by the numeral 47, which extends downwardly throughout substantially the entire length of separator 20. All of the various elements and modules are vertically aligned and centered on central conduit 47, which is preferably composed as a series of pipes, connected by flanges such as flanges 72 shown in FIG. 9. Oil flowing upwardly from each of the sand helix modules 48 through one of the pipes 48a continues upwardly through cone 250 and pipe 252, where the oil then overflows into the space or collection reservoir 254 between the inside of conduit 47 and the outside of cone 250 and pipe 252. The oil in collection reservoir 254 is transferred to lower oil manager 54 by pipe 256. The oil traveling downwardly through pipe 256 is driven by gas under pressure in the chamber or space 258 in the top of separator 20.

Waste water stream (see FIG. 1) enters the separator at the executive 62 and is conveyed upwardly through pipe 270. The mixture of gas, oil, sand, and water enters header 272, which is a circular pipe having holes 273 therein. The mixture of gas, water, oil, and sand is sprayed from the header through holes 273 to effect separation of gas therefrom. The mixture of oil, water, and sand falls into the space generally indicated by the numeral 274 between the outside of central conduit 47 and the inside of cylindrical enclosure 58.

Figure 7:
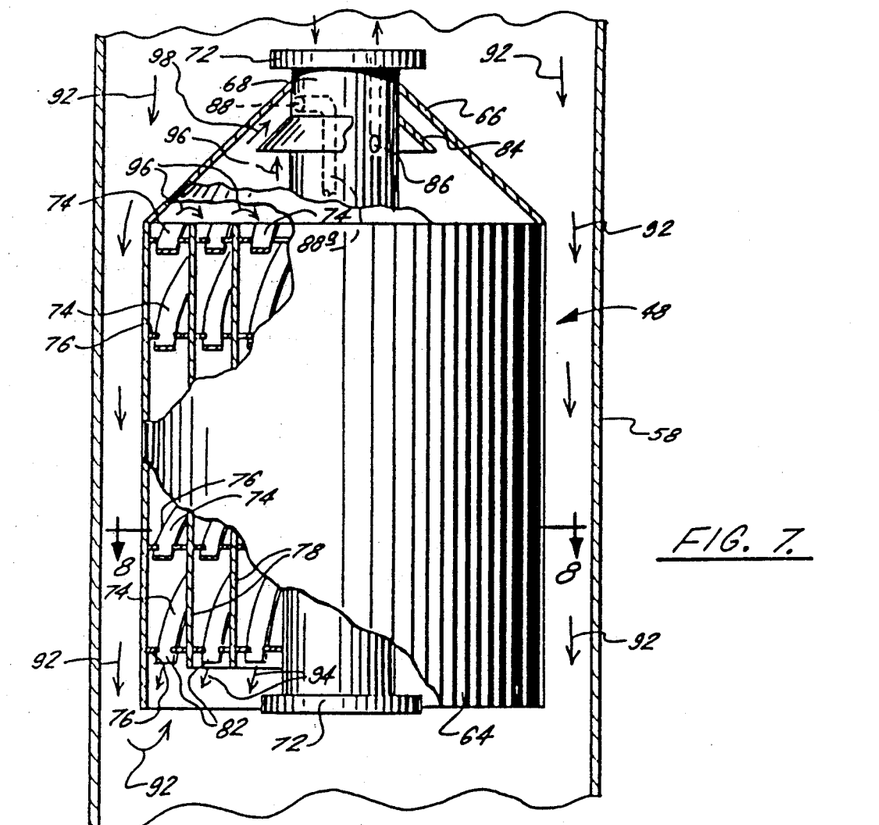
FIG. 7 is a schematic elevational view, partially in section, showing a sand helix module of the present invention.
Figure 8:
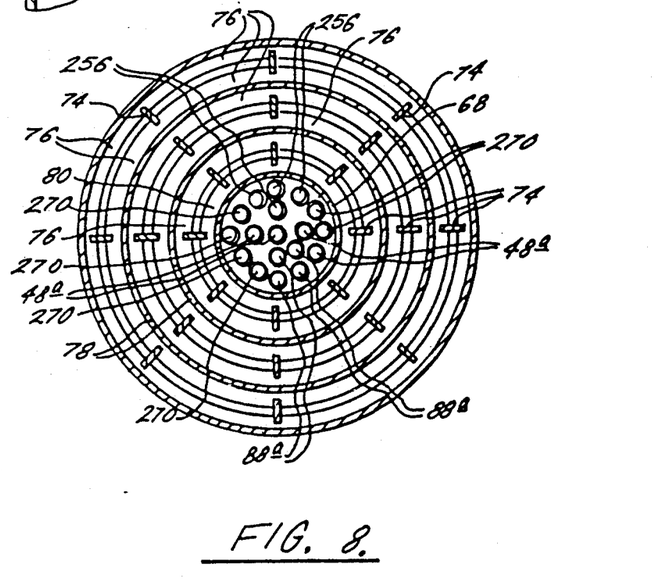
FIG. 8 is a cross-sectional view taken along lines 8—8 of FIG. 7.

Located immediately below the upper oil manager 60 are the sand helix modules generally indicated by the numeral 48 as shown in FIGS. 1, 7, and 8. The sand helix modules 48 are contained within casing 58 and include an outer shell 64 which is generally cylindrical in shape. The bottom of the outer shell 64 is open and has connected thereto a top 66 shaped like a truncated cone.

Located in the center of shell 64 is central conduit 68 which is a continuation of central conduit 47 and is connected thereto by flange 72. Pipe 68 contains smaller pipes 48a, 88a, 256 and 270 for transferring fluids between the various components or stages of separator 20. Flanges 72—72 are located at the top and the bottom of the sand helix module for attaching a series of sand helix modules together or for attaching the sand helix module 48 to another component. The top 66 is rigidly secured to central conduit 68 to prevent any fluid from escaping upwardly between top 66 and central conduit 68.

Located between central conduit 68 and shell 64 are a series of helical vanes 74 held in place by a series of concentric horizontal rings 76. The rings are in turn supported by a series of concentric cylinders 78 to which the horizontal concentric rings 76 are attached. The inner most concentric ring 80 is connected to central conduit 68.

The helical vanes 74 have a bottom edge 82 and a top edge (not shown) which are generally in alignment with the top and bottom end of outer shell 64. The vanes extend from the top to the bottom of shell 64 in a spiral manner. In the embodiment shown in FIGS. 7 and 8 the helical vanes 74 are contained in three chambers formed by the two concentric cylinders 78. The number of chambers and number of vanes may be varied as desired. The length of the vanes can be varied as desired to achieve the desired flow pattern.

In lieu of vanes, helical tubular pipes (not shown) can be aligned similarly to vanes 74 and held in place by a series of concentric horizontal rings 76 (or other suitable means), generally aligned with top and bottom of outer shell 64.

Connected to the upper end of central conduit 68 and beneath the conical top 66 is a baffle 84. Beneath baffle 84 is a hole 86 for intake of oil separated from the water, sand, and oil slurry entering the base of sand helix 48. Any oil which happens to separate in the sand helix 48 enters pipe 48a contained inside of central conduits 68 and 47 through hole 86 and is conveyed upwardly to the upper oil manager 60 through pipes 48a in central conduit 47. Also located above baffle 84 is hole 88 which is the entrance through which water exits the sand helix 48 and enters pipe 88a contained inside of central conduit 68. The water entering through holes 88 is conveyed through pipe 88a to an oil helix 52, or discharged to the sea through the water works executive 62 shown in FIG. 4 via valve 88h, pipe 88b, valve 88c, pipe 88d, hydrocycline 120a, flushing vessel 120c, pipe 120d, valve 120f, and discharge pipe 120g, or through valve 88h, pipe 88e, valve 88f and pipe 88g through the open end 90 of separator 20.

Thus, in operation, the sand helix module 48 receives a flow of water downwardly in casing 58 in the direction indicated by the arrows 92. Water flows between the inside wall of casing 58 and around the bottom of shell 64 and upwardly through vanes 74. The vanes 74, due to their helical shape, swirl the waste water mixture gently upward, creating laminar flow. Based on Stoke's Law, sand particles flow counter currently to the oil an water stream and fall downwardly through the sand helix.

Sand falls downwardly due to its higher density (relative to water) on the upper face of the vanes and out of the bottom of the helix as indicated by the arrows 94. Oil will rise upwardly due to its lower density (relative to water) and the small droplets of oil will strike the underside of the vanes of the sand helices, adhere, and travel upwardly along the underside of the vanes of the sand helices. Oleophyllic (oil wettable) materials (Polypropylene and the like) can be used for the vane material to enhance the efficiency of the Stoke's Law law effect, which assumes that oil particles adhere to, and coalesce when they strike a surface. Droplets may coalesce in suspension and/or while traveling up the vanes. The oil traveling up the vanes is forced up and toward the center of the helix as indicated by the arrows 96 and upwardly into hole 86. Baffle 84 serves to guide the center column of oil into hole 86. Water is forced up and outward between the vanes and travels upwardly as indicated by arrows 98 down pipe 88a through hole 88. Thus, the helically shaped vanes, in addition to Stoke's Law separation, centrifugally force the water and sand to the outside and the oil to the inside, effecting a separation thereof in a favorable manner. Sand falling from the bottom of the module is collected in sand manager 50.

Figure 5:
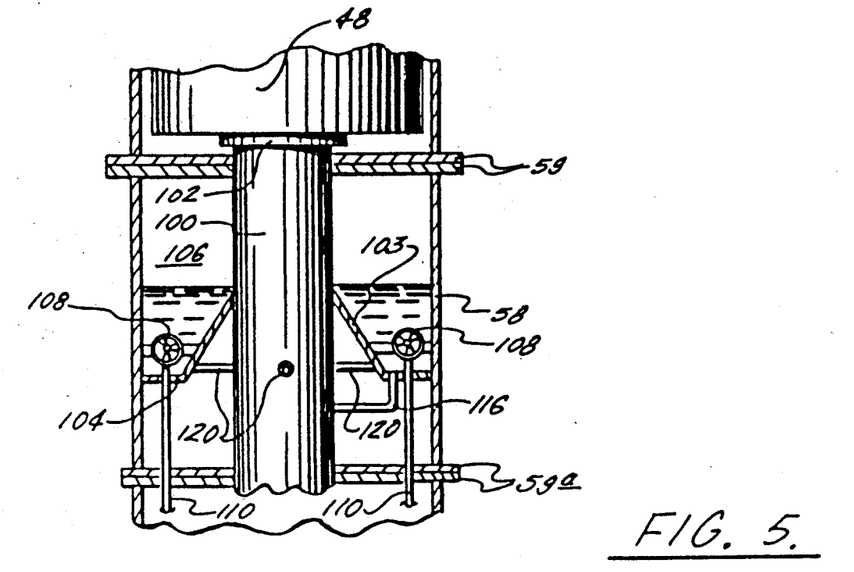
FIG. 5 is a schematic elevational view, partially in section, of the sand manager of the present invention taken along lines 5—5 of the FIG. 6.
Figure 6:
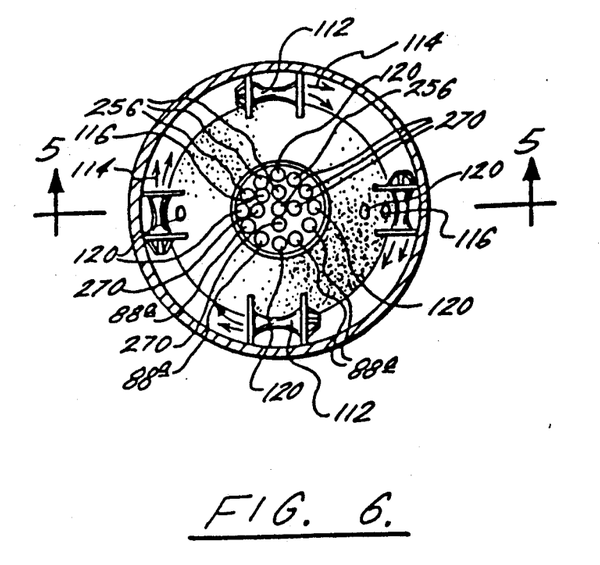
FIG. 6 is a cross-sectional view of FIG. 5 taken along lines 6—6 of FIG. 5.

Located beneath the sand helix module 48 is the sand manager module generally indicated by the numeral 50 in FIGS. 1, 5, and 6. The sand manager 50 has a central conduit 100 in the center thereof which is a continuation of central conduits 47 and 68 and is connected by flange 102 to sand helix module 48 thereabove. Central conduit 100 is similar to central conduit 68 (see FIGS. 7 and 8) and is aligned and flanged thereto. Central conduit 100 receives and contains the various conduits 270, 256, 120 and 88a for transmitting fluids and particles from one component or stage of the separator 20 to another.

Rigidly connected to central conduit 100 is a cone shaped partition 103 which has a horizontal ring 104 internally formed therewith. The combination of the cone shaped partition 103 and ring 104 forms a reservoir 106 for receipt of the recovered sand slurry, indicated by the horizontal broken lines therein.

If the sand contained in the reservoir 106 contains oil, the water jet eductors generally indicated by the numeral 108 may be utilized to thoroughly scour the oil from the oil-covered sand. Water jet eductors 108 are known in the art and contain a high pressure water pipe 110 which sprays water and/or stream into a venturi (hour glass) shaped surface 112. In the separator of the present invention, water, rather than steam will be used. Water under high pressure is forced through the venturi 112 as indicated by the arrow 114. The high pressure water traveling through the eductors 108 forces sand and recirculated water to travel through the eductors and to be highly agitated with the water flowing in through pipe 110. The agitation and turbulence created within the reservoir 106 causes the oil clinging to the sand to be washed or stripped from the sand. The oil stripped from the sand floats up the structure and into the sand helices 48. As the level of water and oil reaches the sand helices, the water and oil are drawn through the sand helices.

Clean and collected in sand manager 50 is withdrawn through drain pipe 116 by opening control valve 118 (see FIG. 4) and discharged overboard into the sea. Alternatively, a slurry of water and oily sand can be withdrawn through pipe 120 continuously when a large amount of sand is being separated. After being scoured by the eductors 108, oil covered sand is removed through pipe 120, and the slurry flows into a hydrocycline 120a in the water works executive 62 shown in FIG. 4. Water and oil flow upwardly through pipe 120b and valve 120h and sand flows into vessel 120c. Sand can be removed through pipe 120d and water can be introduced through pipe 120e for flushing vessel 120c.

Figure 4:
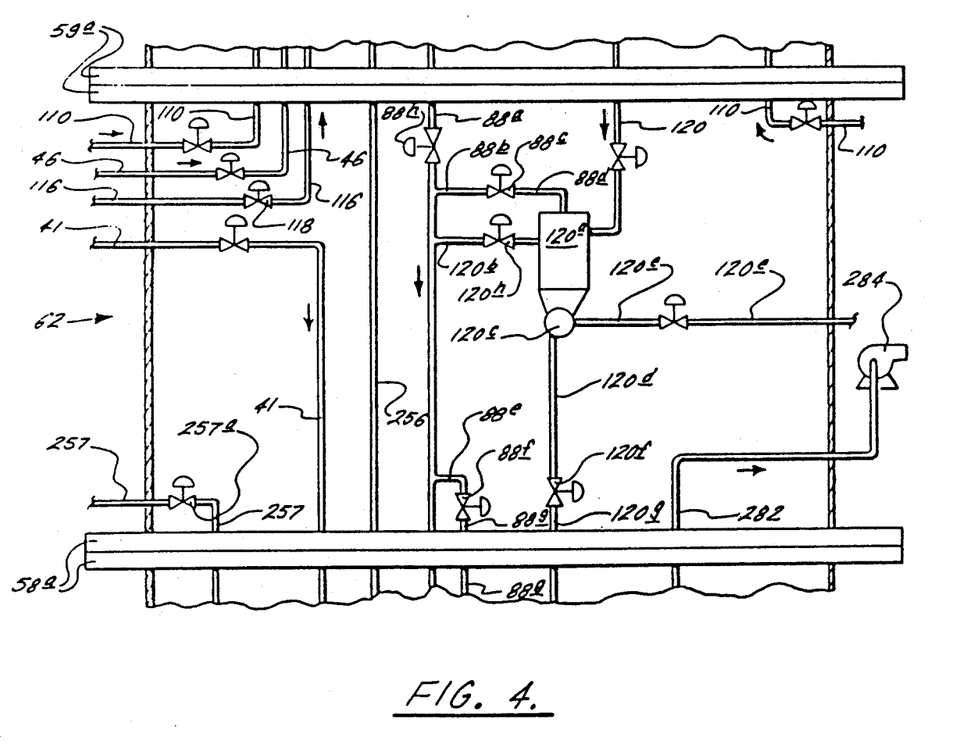
FIG. 4 is a schematic, partially cross-sectional view of the water works executive or flow control assembly of the present invention.

Located between the sand manager and the lower oil manager in a air space with flanged headers on either side, is the water works executive 62 It is an area which houses the controls, valves, meters and the like to control the oil, water and sand flow between the various components. It is the entrance locale for the waste water stream 46, additional gas make up stream 41, high pressure water stream 110, fresh water stream 120e, and an exit point for the oil stream 282. Also, gas can be added or removed through pipe 257. The valves for controlling the oil and water levels by use of gas from the waste water stream 46 or from additional feed gas are maintained therein. The valves can be controlled by hand or electrically or pneumatically. The hydrocyclone 120a and reservoir 120c can also be located within.

Figure 10:
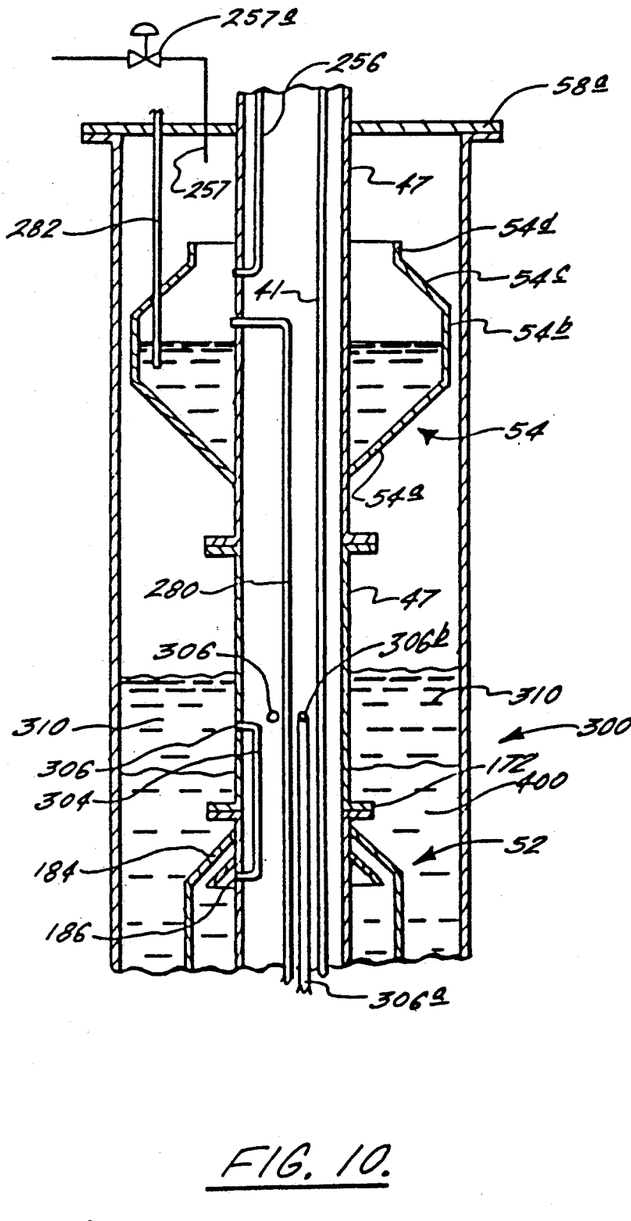
FIG. 10 is a schematic elevational view, partially in section, showing the lower oil manager of the present invention.

Located beneath the water works executive 62 and sand manager 50 is the lower oil manager 54 shown in FIG. 1 and FIG. 10. The lower oil manager receives oil from the upper oil manager 60 through pipes 256 and lower stages or components through pipes 280. Lower oil manager 54 is contained in cylindrical enclosure 58 which is closed at the upper end by flange 58a.

Lower oil manager 54 has outwardly tapered bottom walls 54a connected to vertical intermediate walls 54b and to central conduit 47. Walls 54b are connected to inwardly sloped upper walls 54c. A vertical wall 54d is connected to the top of wall 54c. The walls 54a-54d form a reservoir for holding oil indicated by the horizontal broken lines therein. As can be seen in FIG. 10, gas in the top of the lower oil manager 54 can be removed or added through pipe 257 and valve 257a to control the level of the oil pad 310. Oil contained in oil manager 54 is pumped through pipe 282 by pump 284 to a storage tank 49 on the surface 32 of the platform 22.

Located beneath lower oil manager 54 is an oil reservoir generally indicated by the numeral 300 having a series of holes 306 therein. Here oil, having risen through pipe 304 from oil helices 52 (see FIG. 2, 3 & 10), accumulates as a thick oil pad 310 between central conduit 47 and outer casing 58 which floats on the water 400 in casing 58. Positive pressure is maintained in this whole lower half of separator 20 because of the continuous addition of gas through pipe 40 to lift oil from the oil pad 310 to the lower oil manager 54, and by venting any excess through pipe 257.

Thus, this oil "pad" or reservoir is maintained at a level equal to or slightly lower than minimum sea level. To circumvent the typical problems incurred with "blowcases" or submerged pumps, pipe 306a connected to hole 306b take suction at the oil pad and physically traverses downward through the central conduit 47 for a calculated distance, elbows upward for 180 degrees into pipe 280, and rises in pipe 280 all the way up central conduit 47 past the suction level to the lower oil manager 54 (see FIGS. 3 & 10). Gas line 40 also runs down the conduit 47 and ties in the upflow side, slightly above the lowest point, of the pipe 280, and utilizes what is known in the art as "gas lift" to raise the oil into the reservoir of the lowest oil manager.

Figure 2:
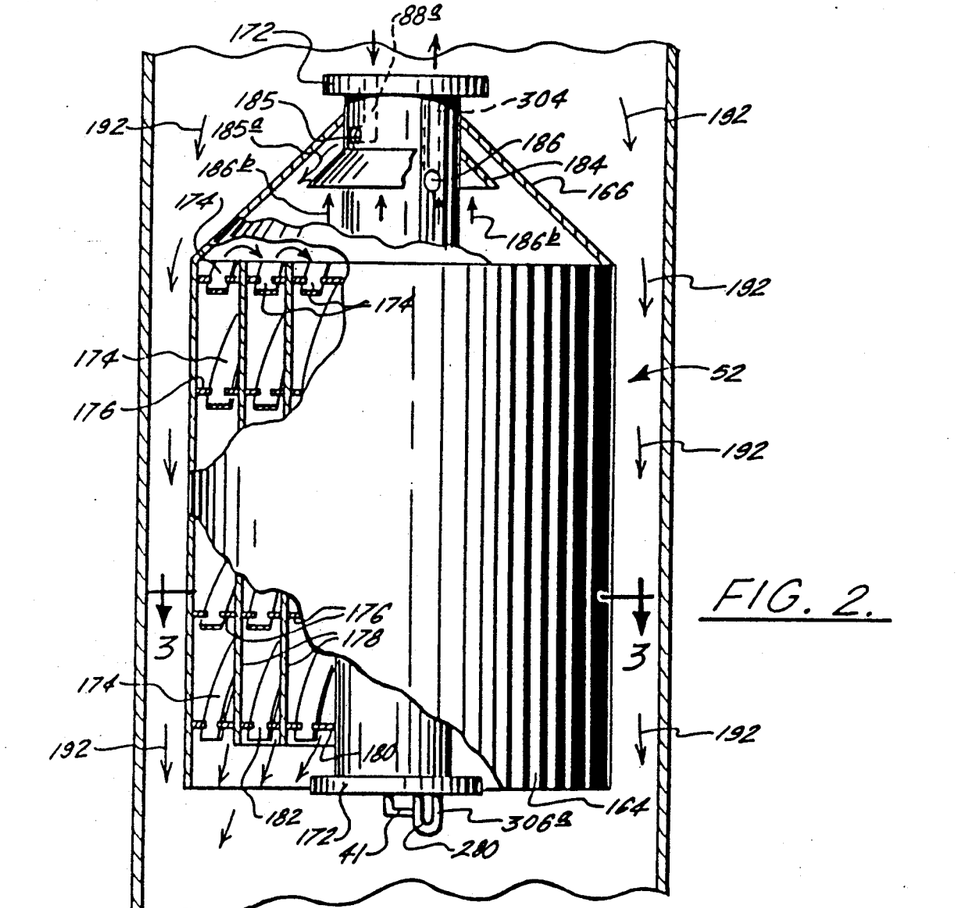
FIG. 2 is a schematic elevational view, partially in section, showing an oil helix module of the present invention.
Figure 3:
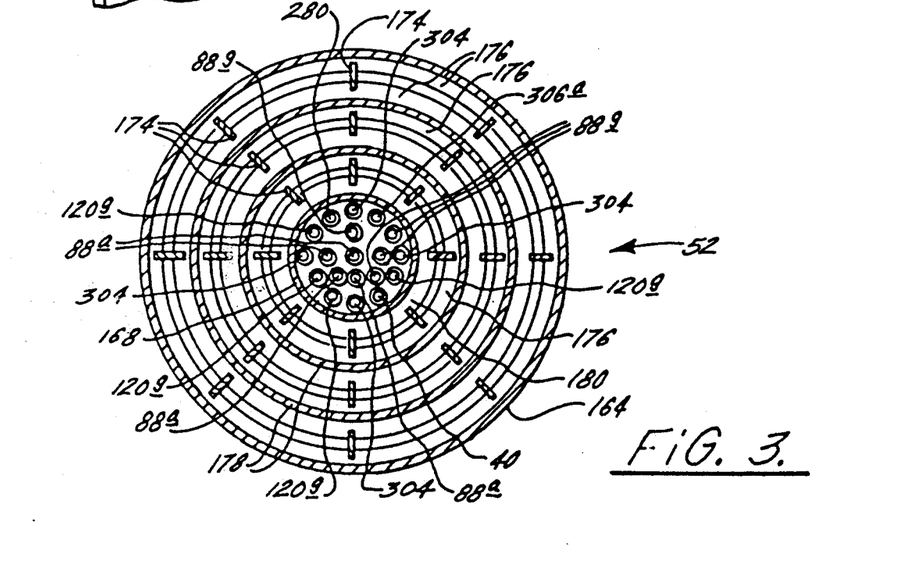
FIG. 3 is a cross-sectional view taken along lines 3—3 of FIG. 2.

Located beneath the oil pad 310 is the oil helix module generally indicated by the numeral 52 (see FIGS. 2 & 3). The oil helix receives waste water from the sand helix through pipe 88a. The oil helix module 52 is identical in design and construction to the sand helix previously described and shown in FIGS. 7 and 8 with the exception that the piping inside of the central conduit indicated by the numeral 168 in FIG. 2 and 68 in FIG. 7 includes pipes 40, 88a, 88g, 120g, 280, 304 and 306a. The oil helix 52 contained within casing 58 includes an outer shell 164 which is generally cylindrical in shape. The bottom of the outer shell 164 is open and the top 166 is shaped like a truncated cone. Located in the center of shell 164 is central conduit 168 which contains a series of smaller pipes 40, 88a, 88g, 120g, 280, 304, and 306a for transferring fluids between the various components and stages of separator 20. Flanges 172—172 are located at the top and the bottom of the oil helix module 52 for attaching a series of modules together or for attaching different modules above and below. The top 166 rigidly secured to pipe 168 to prevent any fluids from escaping upwardly between top 166 central conduit 168.

Located between central conduit 168 and 164 are a series of helical vanes 174 held in place by a series of concentric horizontal rings 176. The rings are in turn supported by a series of concentric cylinders 178 to which the horizontal concentric rings 176 are rigidly attached. The inner-most concentric ring 180 is rigidly connected to central conduit 168.

The helical vanes 174 have a bottom edge 182 and a top edge (not shown) which are generally in alignment with the top and bottom ends of outer shell 164. In the embodiment shown in FIGS. 2 and 3 the helical vanes 174 are contained in three chambers formed by the two concentric cylinders 178. The number of chambers and number of vanes may be varied as desired. The length of the vanes can be varied as desired to achieve the desired flow pattern.

In lieu of vanes, helical tubular pipes (not shown) can be similarly aligned similarly to vanes 174 and held in place by a series of concentric horizontal rings 176 (or other suitable means), generally aligned with top and bottom end of outer shell 164.

Connected to the upper end of central conduit 168 and beneath the conical top 166 is a baffle 184. Beneath baffle 184 is a hole 186 for the intake of oil separated and coalesced from the oil and water slurry which enters the oil and helix through the hole 185.

The oil separated from the oil and water stream exits the oil helix 52 and enters pipe 304 contained inside of the central conduit 168 through holes 186 and is conveyed upwardly to the oil pad 310 (see FIG. 10). Hole 185 is located above the baffle 184 and is the entrance, by pipe 88a, through which the oil and water stream enters the oil helix as indicated by the arrow 185a. The oil and water mixture travels over the baffle as indicated by the arrow 185a and encounters the helical vanes 174.

Thus, in operation, the oil helix modules 52 are surrounded by a flow of water downwardly discharged from above the module 52 in casing 58 in the direction indicated by the arrows 192 thus maintaining water throughout the casing and at the bottom of shell 164. The flow of water downwardly from above the module 52 comes either from optional deck drain flow lines (not shown) on platform 32 entering casing 58 immediately below the oil pad 310 or from the oil helix modules 52 located above lower oil helix modules 52. If there is only one oil helix module and no deck drains, there would be no flow down around the top of oil helix If a plurality of oil helices 52 are used, there would be no flow down around the top oil helix if there were no deck drain connections. Water entering the oil helix 52 through entrance 185 encounters the vanes 174 and swirls gently downward, remaining in the Reynold's laminar flow regime. Based on Stoke's Law, oil particles flow counter currently to the water stream and rise upwardly through the oil helix. Oil will rise upwardly due to its lower density (relative to water) and the small droplets of oil will strike the underside of the vanes of the oil helices 52, adhere, and travel upwardly along the underside of the vanes of the oil helices 52 into hole 186 as indicated by the arrows 186b. The water continues to travel downwardly and joins the stream 192 after its exit from the bottom of the module. Thus the helical shaped vanes, in addition to Stoke's Law separation, centrifugally force the water to be outside of shell 164 and the oil to the inside of the shell, effecting the separation of the oil-water stream in a favorable manner.

The amount of sand helix modules 48 and oil helix modules 52 may be varied to achieve the degree of separation desired. One, two, three or more of the sand helix modules 48 or oil helix modules 52 may be utilized. Preferably, three sand helix modules 48 and three oil helix modules 52 are used.

Both the sand helix (or helices) 48 and the oil helix (or helices) 52 must have means for causing fluids to flow therethrough in a spiral or swirling manner to separate oil and sand from water, such means having a surface to which small droplets will adhere and travel upwardly. The means for causing fluids to flow in a spiral or swirling manner can be hollow pipes or vanes 74 and 174 arranged in the helix in a spiral configuration. The vanes or pipes are parallel when viewed from a vertical cross-section and vertical when viewed through a horizontal cross section.

Figure 11:
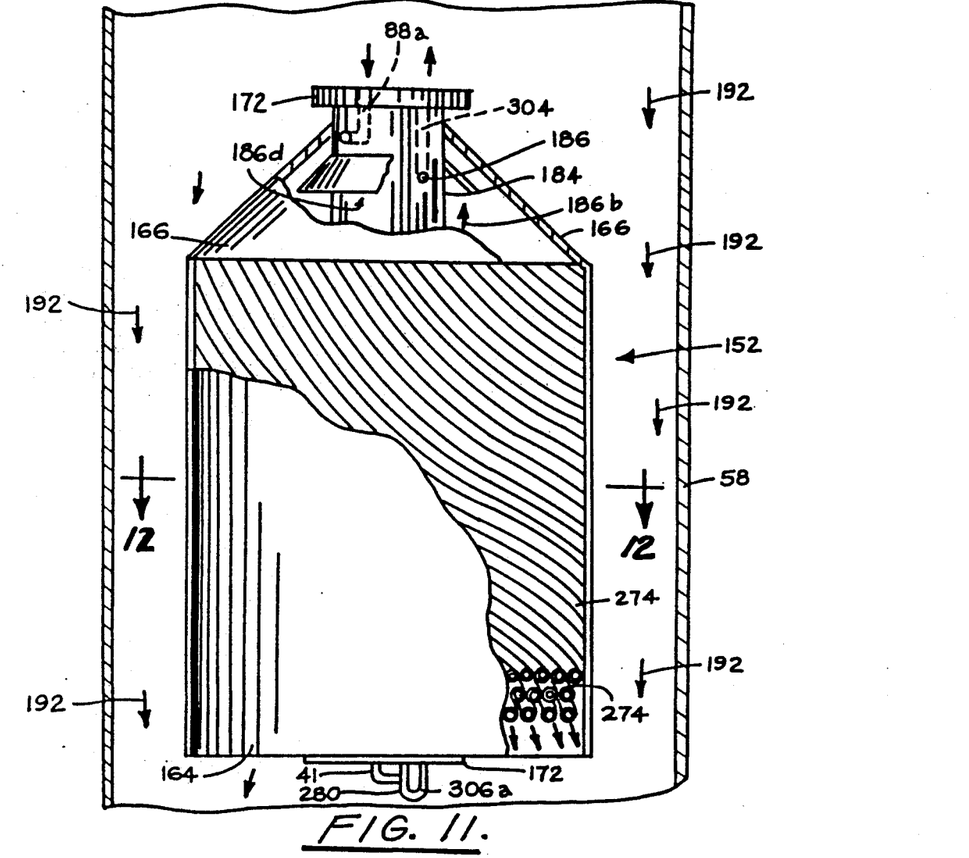
FIG. 11 is a schematic elevational view, partially in section, showing an alternate embodiment of an oil helix module of the present invention.
Figure 12:
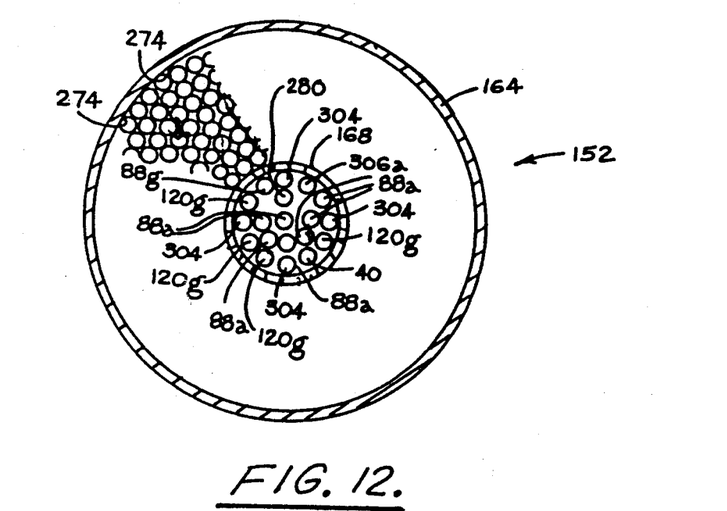
FIG. 12 is a cross-sectional view taken along lines 12—12 of FIG. 11.

An alternate embodiment of the invention is shown in FIGS. 11 and 12, wherein the vanes 74 of sand helix 48 are replaced with helical tubular pipes 374 in sand helix 148. Sand helix 148 can be used interchangeably, or in place of, sand helix 48. Sand helix 148 is very similar to sand helix 48 except for the substitution of pipes 374 for vanes 74, concentric rings 76, and concentric cylinders 78, and the same reference numerals used in describing sand helix 48 will be used in the following description of sand helix 148 where appropriate. The sand helix modules 148 are contained within casing 58 and include an outer shell 64 which is generally cylindrical in shape. The bottom of the outer shell 64 is open and has connected thereto a top 66 shaped like a truncated cone.

Located in the center of shell 64 is central conduit 68 which is a continuation of central conduit 47 and is connected thereto by flange 72. Pipe 68 contains smaller pipes 48a, 88a, 256 and 270 for transferring fluids between the various components or stages of separator 20. Flanges 72—72 are located at the top and the bottom of the sand helix module for attaching a series of sand helix modules together or for attaching the sand helix module 148 to another component. The top 66 is rigidly secured to central conduit 68 to prevent any fluid from escaping upwardly between top 66 and central conduit 68.

Located between central conduit 68 and shell 64 are a series of helical tubular pipes 374. The pipes 374 are equal in length and completely fill the space between the shell 64 and the central conduit 68. Pipes 374 are coiled about central conduit 68 in a helical pattern.

The helical pipes 374 have their top ends in alignment with the top end of outer shell 64. The pipes extend from the top to the bottom of shell 64 in a spiral manner. The bottom ends of the pipes lie at various distances from the bottom of shell 64 depending on their distance from central conduit 68.

The number of pipes may be varied as desired. The length of the vanes or pipes can be varied as desired to achieve the desired flow pattern.

Connected to the upper end of central conduit 68 and beneath the conical top 66 is a baffle 84. Beneath baffle 84 is a hole 86 for intake of oil separated from the water, sand, and oil slurry entering the base of sand helix 148. Any oil which happens to separate in the sand helix 148 enters pipes 48a contained inside of central conduits 68 and 47 through hole 86 and is conveyed upwardly to the upper oil manager 60 through pipes 48a in central conduit 47. Also located above baffle 84 is hole 88 which is the entrance through which water exits the sand helix 48 and enters pipe 88a contained inside of central conduit 68. The water entering through holes 88 is conveyed through pipe 88a to an oil helix 52, or discharged to the sea through the water works executive 62 shown in FIG. 4 via valve 88h, pipe 88b, valve 88c, pipe 88d, hydrocyclone 120a, flushing vessel 120c, pipe 120d, valve 120f, and discharge pipe 120g, or through valve 88h, pipe 88e, valve 88f and pipe 88g through the open end 90 of separator 20.

Thus, in operation, the sand helix module 148 receives a flow of water downwardly in casing 58 in the direction indicated by the arrows 92. Water flows between the inside wall of casing 58 and around the bottom of shell 64 and upwardly through the pipes 374. The pipes 374, due to their helical shape, swirl the waste water mixture gently upward, creating laminar flow. Based on Stoke's Law, sand particles flow counter currently to the oil and water stream and fall downwardly through the sand helix.

Sand falls downwardly due to its higher density (relative to water) on the upper face of the vanes and out of the bottom of the helix as indicated by the arrows 94. Oil will rise upwardly due to its lower density (relative to water) and the small droplets of oil will strike the underside of the vanes of the sand helices, adhere, and travel upwardly along the underside of the vanes of the sand helices. Oleophyllic (oil wettable) materials (Polypropylene and the like) can be used for the pipe material to enhance the efficiency of the Stoke's Law effect, which assumes that oil particles adhere to, and coalesce when they strike a surface. Droplets may coalesce in suspension and/or while traveling up the vanes. The oil traveling up the vanes is forced up and toward the center of the helix as indicated by the arrows 96 and upwardly into hole 86. Baffle 84 serves to guide the center column of oil into hole 86. Water is forced up and outward between the vanes and travels upwardly as indicated by arrows 98 down pipe 88a through hole 88. Thus, the helically shaped pipes, in addition to Stoke's Law separation, centrifugally force the water and sand to the outside and the oil to the inside, effecting a separation thereof in a favorable manner. Sand falling from the bottom of the module is collected in sand manager 50.

Figure 13:
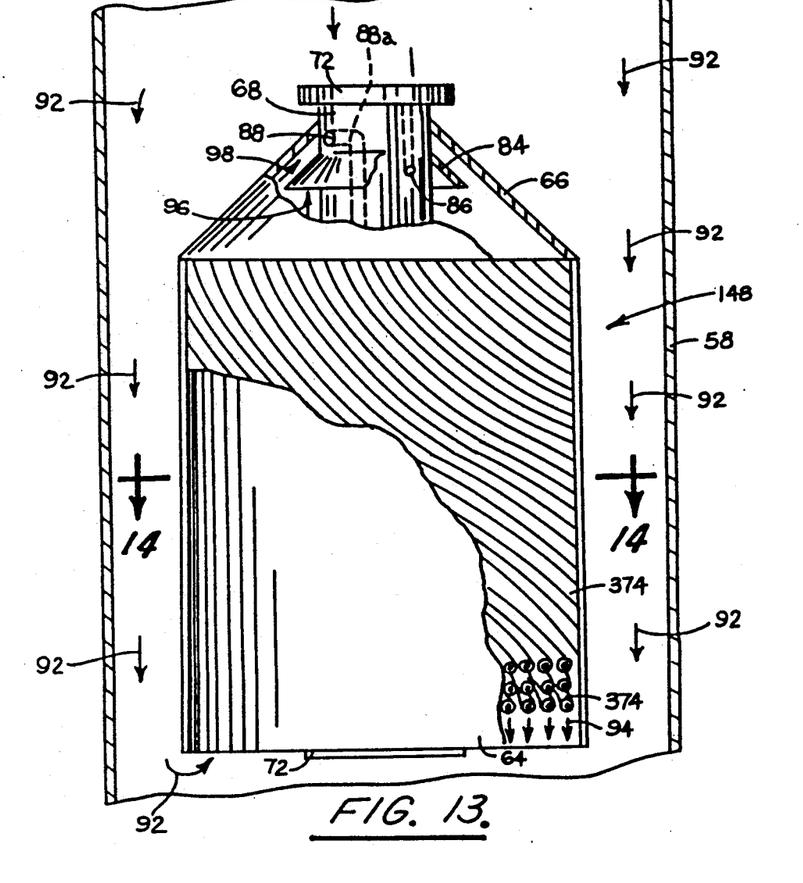
FIG. 13 is a schematic elevational view, partially in section, showing an alternate embodiment of the sand helix module of the present invention.
Figure 14:
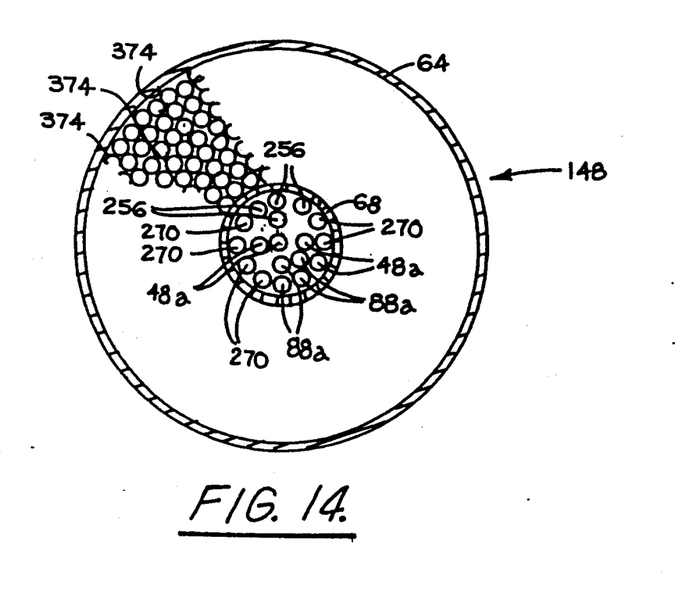
FIG. 14 is a cross-sectional view taken along lines 14—14 of FIG. 13.

An alternate embodiment of the invention is shown in FIGS. 13 and 14, wherein the vanes 74 of oil helix 152 are replaced with helical tubular pipes 274 in oil helix 152. Oil helix 152 can be used interchangeably, or in place of, sand helix 48. Oil helix 152 is very similar to oil helix 52 except for the substitution of pipes 274 for vanes 174, concentric rings 176, and concentric cylinders 178, and the same reference numerals used in describing oil helix 52 will be used in the following description of oil helix 152 where appropriate.

The oil helix 152 contained within casing 58 includes an outer shell 164 which is generally cylindrical in shape. The bottom of the outer shell 164 is open and the top 166 is shaped like a truncated cone. Located in the center of shell 164 is central conduit 168 which contains a series of smaller pipes 40, 88a, 88g, 120g, 280, 304, and 306a for transferring fluid between the various components and stages of separator 20. Flanges 172—172 are located at the top and the bottom of the oil helix module 152 for attaching a series of modules together or for attaching different modules above and below. The top 166 is rigidly secured to pipe 168 to prevent any fluids from escaping upwardly between top 166 central conduit 168.

Located between central conduit 168 and shell 164 are a series of helical tubular pipes 274. The pipes 274 are equal in length and completely fill the space between the shell 164 and the central conduit 168. Pipes 274 are coiled about central conduit 168 in a helical pattern.

The helical pipes 274 have their top ends in alignment with the top end of outer shell 164. The bottom ends of the pipes 274 lie at various distances from the bottom of shell 164 depending on their distance from central conduit 168.

The number of chambers and number of vanes may be varied as desired. The length of the vanes or pipes can be varied as desired to achieve the desired flow pattern.

Connected to the upper end of central conduit 168 and beneath the conical top 166 is a baffle 184. Beneath baffle 184 is a hole 186 for the intake of oil separated and coalesced from the oil and water slurry which enters the oil and helix through hole 185.

The oil separated from the oil and water stream exits the oil helix 152 and enters pipe 304 contained inside of the central conduit 168 through holes 186 and is conveyed upwardly to the oil pad 310 (see FIG. 10). Hole 185 is located above the baffle 184 and is the entrance, by pipe 88a, through which the oil and water stream enters the oil helix as indicated by the arrow 185a. The oil and water mixture travels over the baffle as indicated by the arrow 185a and encounters the helical pipes 274.

Thus, in operation, the oil helix modules 152 are surrounded by a flow of water downwardly discharged from above the module 52 in casing 58 in the direction indicated by the arrows 192 thus maintaining water throughout the casing and at the bottom of shell 164. The flow of water downwardly from above the module 152 comes either from optional deck drain flow lines (not shown) on platform 32 entering casing 58 immediately below the oil pad 310 or from the oil helix modules 152 located above lower oil helix modules 152. If there is only one oil helix module 152 and no deck drains, there would be no flow down around the top oil helix. If a plurality of oil helices 152 are used, there would be no flow down around the top oil helix if there were no deck drain connections. Water entering the oil helix 152 through entrance 185 encounters the pipes 274 and swirls gently downward, remaining in the Reynold's laminar flow regime. Based on Stoke's Law, oil particles flow counter currently to the water stream and rise upwardly through the oil helix. Oil will rise upwardly due to its lower density (relative to water) and the small droplets of oil will strike the underside of the vanes of the oil helices 152, adhere, and travel upwardly along the underside of the vanes of the oil helices 152 into hole 186 as indicated by the arrows 186b. The water continues to travel downwardly and joins the stream 192 after its exit from the bottom of the module. Thus the helical shaped vanes, in addition to Stoke's Law separation, centrifugally force the water to the outside of shell 164 and the oil to the inside of the shell, effecting the separation of the oil-water stream in a favorable manner.

The amount of sand helix modules 148 and oil helix modules 152 may be varied to achieve the degree of separation desired. One, two, three or more of the sand helix modules 48 or oil helix modules 152 may be utilized. Preferably, three sand helix modules 48 and three oil helix modules 152 are used.

It should be understood that the apparatus of the invention could be used on onshore rigs, offshore rigs, or to treat any waste water stream containing water oil, and/or sand. Furthermore, the term "oil" can include any two fluids that form two phases. To utilize the apparatus of the invention onshore, it would only be necessary to enclose the bottom and attach a valve, pipes, and a pressure control mechanism to maintain water and oil levels. Also, a different configuration such as two columns separated at the water works executive 62 with different valve settings to maintain a similar operating environment can be used.

Although the preferred embodiments of the present invention have been disclosed and described in detail above, it should be understood that the invention is in no sense limited thereby, and its scope is to be determined by that of the following claims.

What is claimed is:

1. An oil separator for removing oil from a flowing waste stream of waste fluid comprising:

a cylindrical separator body having a bore with a center, an open bottom, and an open top each communicating with the bore so that fluid can flow from the open bottom to the open top via the bore;

a plurality of vanes, each defining a spiral path for fluid traversing the bore from the open bottom to the open top, the vanes being spaced radially from the center of the bore;

each vane having a surface to which oil particules can adhere and coalesce as the oil particles travel upwardly thereupon; the vanes being positioned in the bore;

i) to swirl waste fluid upwardly, creating laminar flow, ii) to centrifugally force the waste fluid outwardly in a direction away from the bore center;

wherein the center of the bore is occupied by a central portion defined by a cylinder smaller than the body; the vanes are spaced radially from the cylinder;

wherein the separator body is a cylinder; the central portion of the bore is a smaller, concentric cylinder;

wherein the body comprises a pair of concentric cylinders of large and middle size;

the central portion of the bore has a third, smallest concentric cylinder;

there is a first plurality of vanes extending between the large and middle sized cylinders; and there is a second plurality of vanes extending from the middle sized to the smallest cylinder.

2. The apparatus of claim 1, wherein the separator body provides a central cylindrical bore with an axis that is vertically positioned during operation.

3. The apparatus of claim 1, wherein each vane provides a generally flat surface for receiving the oil particles during separation.

4. The apparatus of claim 1, wherein the plurality of vanes comprise a plurality of spirally positioned separate conduits, each having a continuous outer wall so that the walls of adjacent conduits are closely positioned and follow similar spiral paths.

5. The apparatus of claim 1, wherein the plurality of vanes define a helical path.

6. The apparatus of claim 1, wherein the vanes each define a corresponding helical path.

* * * * *